United States Patent
Pape et al.

(10) Patent No.: US 7,124,610 B2
(45) Date of Patent: Oct. 24, 2006

(54) METHOD FOR PRODUCING A TORSIONAL VIBRATION DAMPER HOUSING, ESPECIALLY A HOUSING FOR A VISCOSITY TORSIONAL VIBRATION DAMPER

(75) Inventors: Rolf Pape, Berlin (DE); Klaus Peter Seidel, Berlin (DE)

(73) Assignees: Hasse & Wrede GmbH, Berlin (DE); WF Maschinenbau- und Blechformtechnik GmbH & Co. KG, Sendenhorst (DE)

( * ) Notice: Subject to any disclaimer, the term of this patent is extended or adjusted under 35 U.S.C. 154(b) by 188 days.

(21) Appl. No.: 10/324,116

(22) Filed: Dec. 20, 2002

(65) Prior Publication Data

US 2003/0131644 A1    Jul. 17, 2003

Related U.S. Application Data

(63) Continuation of application No. PCT/EP01/06967, filed on Jun. 20, 2001.

(30) Foreign Application Priority Data

Jun. 20, 2000    (DE) ................. 100 29 317

(51) Int. Cl.
B21D 22/14    (2006.01)
(52) U.S. Cl. ............................ 72/84; 29/892
(58) Field of Classification Search ............ 72/71, 72/84; 29/892, 892.2, 892.3, 893.32
See application file for complete search history.

(56) References Cited

U.S. PATENT DOCUMENTS

| | | | | |
|---|---|---|---|---|
| 5,236,115 A | * | 8/1993 | Pape | 228/170 |
| 5,987,952 A | * | 11/1999 | Kutzscher et al. | 72/71 |
| 6,105,410 A | * | 8/2000 | Sauberlich et al. | 72/71 |

FOREIGN PATENT DOCUMENTS

| | | |
|---|---|---|
| DE | 951965 | 11/1956 |
| EP | 0423243 | 8/1994 |
| EP | 0512295 | 10/1995 |
| EP | 0534424 | 8/1996 |
| GB | 736808 | 9/1955 |
| WO | 96/41974 | 12/1996 |

* cited by examiner

*Primary Examiner*—Lowell A. Larson
(74) *Attorney, Agent, or Firm*—Crowell & Moring LLP

(57) ABSTRACT

The invention relates to a method for producing a torsional vibration damper housing, especially the housing for a viscosity torsional vibration damper, whereby the damper housing is manufactured from an existing plate circular blank and the shaping of the damper housing occurs in an impact extrusion machine during a non-cutting impact extrusion shaping method. In successive impact extrusion shaping steps, all parts of the damper housing protruding from the plane of the plate circular blank, which forms the housing rear wall, are impact extruded while reducing the wall thickness of said parts to form a one-piece damper housing. Said damper housing is structured such that the area of the fastening flange has the largest thickness.

9 Claims, 6 Drawing Sheets

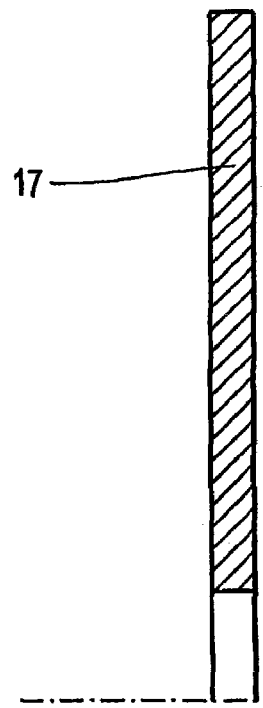
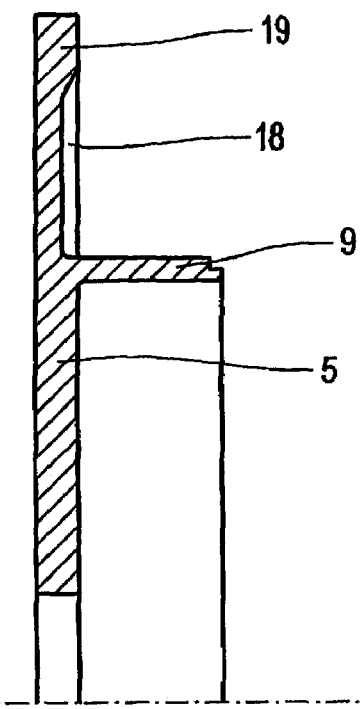
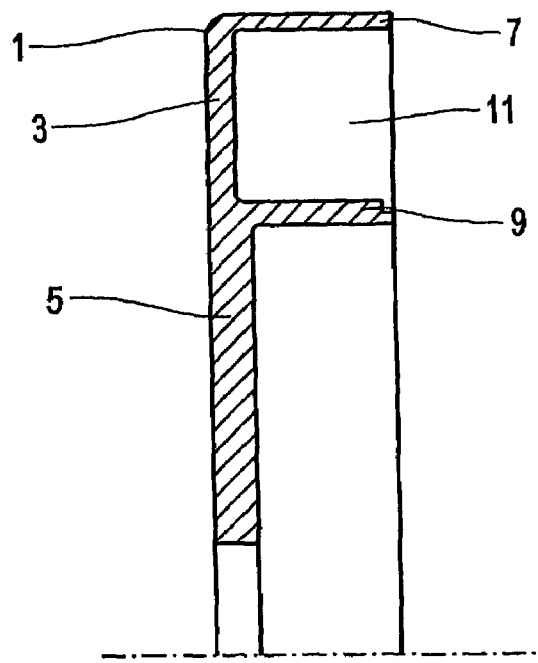

Fig. 4a  Fig. 4b  Fig. 4c
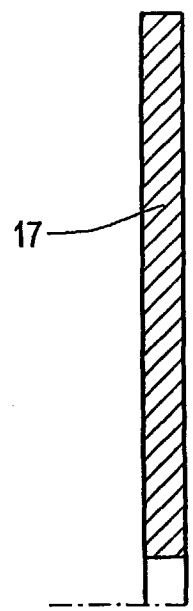
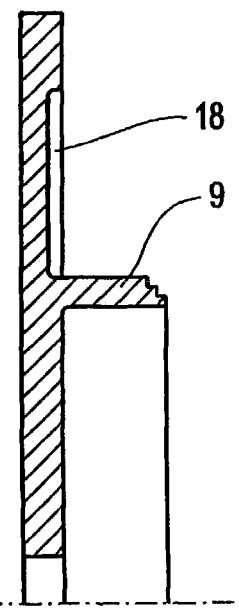
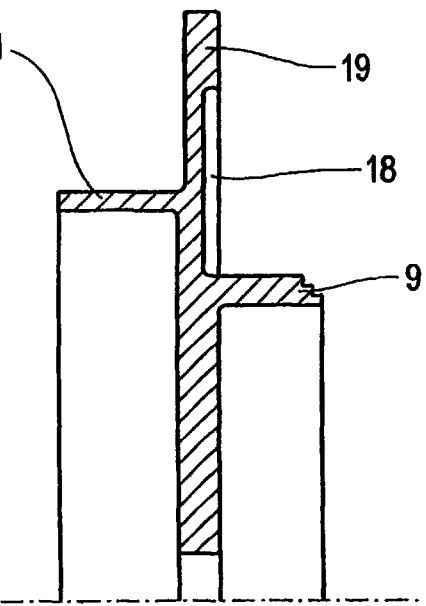
Fig. 4d  Fig. 4e
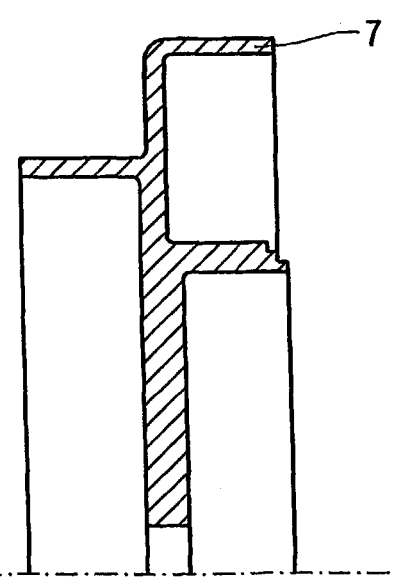
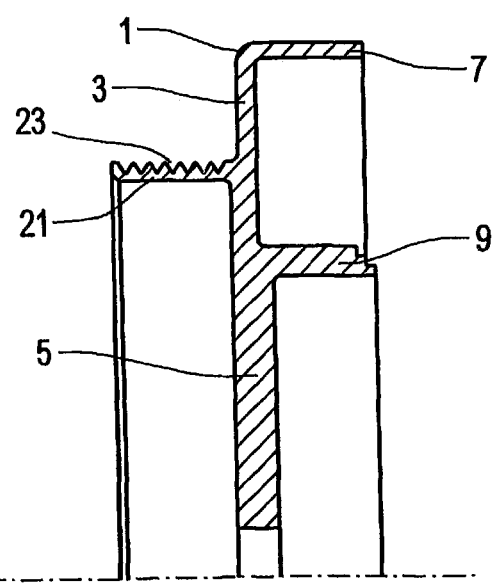

METHOD FOR PRODUCING A TORSIONAL VIBRATION DAMPER HOUSING, ESPECIALLY A HOUSING FOR A VISCOSITY TORSIONAL VIBRATION DAMPER

CROSS REFERENCE TO RELATED APPLICATIONS

This application is a continuation of international patent application no. PCT/EP01/06967, filed Jun. 20, 2001, the entire disclosure of which is hereby incorporated herein by reference. Priority is claimed based on Federal Republic of Germany patent application no. DE 100 29 317.4, filed Jun. 20, 2000.

BACKGROUND AND SUMMARY OF THE INVENTION

The invention relates to a method for producing a torsional vibration damper housing and, in particular, a housing for a viscosity torsional vibration damper having a working chamber, which is constructed in the damper housing, can be filled with a viscous damping medium and in which a seismic ring is disposed, as well as having a fastening flange for fastening to a rotating machine part to be damped. The damper housing is produced from an existing thick circular plate blank and formed in an impact extrusion machine by a non-cutting impact extrusion shaping method.

Viscosity torsional vibration dampers of the above-mentioned construction are known having multiple constructive designs. Likewise, various manufacturing methods are known according to which such dampers and damper housings, respectively, are manufactured. When producing the above-mentioned viscosity torsional vibration dampers (in the following abbreviated to "visco-dampers"), a housing body is generally formed, which comprises a working chamber for accommodating a seismic inertia ring and a viscous damping medium. The seismic inertia ring is disposed to be sliding with a limited amount of play in the working chamber. The remaining gap spaces between the seismic ring and the working chamber are filled with a highly viscous silicone oil as the damping medium. By means of a radially interior flange, the ring-shaped damper housing is screwed to a rotating machine part which is to be damped, as a rule, to the shaft to be damped. In most applications, this is the crankshaft of a piston engine, mainly a diesel engine, on whose opposite face the visco damper is mounted.

Originally, to the extent that they were to be closed-off by means of a welded-on or rolled-in lid, the housings of the visco-dampers were "worked" or manufactured out of a solid material, of preformed pressed parts and of ductile cast iron in a cutting manner, as known, for example, from FIG. 6 of German Patent Document DE 951 965. For economical considerations, the so-called thin-sheet housing was later developed. The thin-sheet housing was joined together from two deep-drawn sheet metal caps by means of electron-beam welding. International Patent Document WO 96/41974 describes such a two-part housing.

In order to reduce the working or manufacturing steps, early attention was also given to producing one-piece thin sheet metal housings produced by high-expenditure hydro-forming, pressing and burnishing. This, however, resulted in a sparsely dimensioned flange thickness only when the lid was added. This operation is described by the state of the art disclosed in European Patent Document EP 0 423 243 B1.

European Patent Document EP 0 503 424 B1 describes a damper with at least one molded-on ribbed V-belt track.

All of the above-mentioned production methods known from the prior art require high expenditures with respect to the machines and tools required for the forming of the above-mentioned thin-sheet metal housings. As such, the variety of visco-damper types that can be produced is extremely disadvantageously limited by the required high expenditures. The desire remains, therefore, to produce multiple housing shapes from simple circular plate blanks at reasonable cost. One step in this direction is described in the state of the art disclosed in European Patent Document 0 512 295, which describes the splitting of housing blanks in the form of circular plate blanks.

Based on the disadvantages indicated in the prior art with respect to the high expenditures for machines and tools for implementing a plurality of damper types, it is an object of the invention to produce, in a novel manner, a thick circular metal plate blank in a non-cutting manner in a damper housing with arbitrary dimensions and wall thicknesses differentiated according to the corresponding stress for a plurality of damper types.

In particular, it is an object of the invention to produce, by means of simple process steps and without a high-expenditure tool change, a housing body which does not have only one working chamber, but in a simple manner with the same process steps has additional pulleys or supporting collars and coupling elements.

According to the present invention, this and other objects are achieved by a method for producing a torsional vibration damper housing, in which, in successive impact extrusion forming steps, all parts of the damper housing projecting out of the plane of a circular plate blank, which forms the rear wall of the housing, are impact-extruded from the circular plate blank while reducing its wall thickness in a non-cutting manner to form a one-piece damper housing.

Advantageous developments and further developments of the invention are described herein.

By means of successive impact extrusion forming steps, using an impact extrusion roller and a mandrel body, the material of a thick circular plate blank is impact-extruded on both sides of the circular plate blank. In this case, the walls of the working chamber as well as additional pulleys, supporting collars and coupling seats are shaped-out by reducing the wall thickness of the circular plate blank due to the impact extruding. In a first working step, the fixing of the circular plate blank takes place on an impact extrusion machine. In a next working step, the pressing of the radially interior wall partially forming the working chamber, of the bearing block, from the circular plate blank takes place, beginning at a defined distance from its radial circumference by means of the impact extrusion roller acting against a mandrel body radially toward the inside. The elevation which is formed radially on the outside on the circumference of the circular plate blank is pressed by means of an impact extrusion roller against a cylinder sleeve and, while forming out the radially exterior wall extending at a right angle away from the circular plate blank, the outer jacket of the working chamber is constructed. On the surface of the outer jacket oriented toward the outside, by pressing the outer jacket against a pressing mandrel body, a profiled running track is constructed, particularly a so-called poly-V track for receiving a profiled traction device, and here particularly a ribbed V-belt.

By means of additional process steps, by impact extruding the rear wall of the housing on the side of the circular plate blank opposite the working chamber against an impact extrusion mandrel body from a radially outward to inward direction, a rearward pulley is constructed. As a function of the desired damper type, the displacement of the material volume on the rear wall of the housing of the circular plate blank takes place by means of the impact extrusion roller. This additional pulley, which is provided for receiving a traction device, is also profiled with a profiled surface, particularly a running track, while impact extruding the surface of the pulley.

In a further process step, by further impact extruding on the side of the circular plate blank situated opposite the outer jacket and the bearing block, a supporting collar and a coupling seat for receiving a torsionally elastically uncoupled pulley are constructed in a non-cutting manner, by impact extruding against an impact extrusion mandrel body. During the various process steps of the impact extruding, the wall thickness of the circular plate blank, which forms the rear wall of the damper housing, is reduced by displacing the material volumes into the housing elements of the various damper housing types respectively, which extend from the rear wall of the housing or the circular plate blank, as a rule, at a right angle.

The construction of the supporting collars by impact extruding the circular plate blank takes place from the radially outward to inward direction by impact extruding against an impact extrusion mandrel body. In this case, in a further process step, the coupling seat is thrown up against an impact extrusion mandrel body, in that an impact extrusion roller impact extrudes from a radially outward direction, starting after the supporting collar, radially inwardly in the direction of the center bore. This has the advantage that, in the area of the coupling seat (thus radially around the center bore), the rear wall of the housing has a larger wall thickness than in the other areas.

Other objects, advantages and novel features of the present invention will become apparent from the following detailed description of the invention when considered in conjunction with the accompanying drawings.

BRIEF DESCRIPTION OF THE DRAWINGS

FIGS. 2a–2c are schematic sectional views of the process according to the invention for producing the damper housing of a visco-damper according to the invention illustrated in FIG. 1;

FIGS. 4a–4e are schematic sectional views of the process according to the invention for producing the damper housing illustrated in FIG. 1 with the rearward profiled pulley;

DETAILED DESCRIPTION OF THE DRAWINGS

Figure 1:
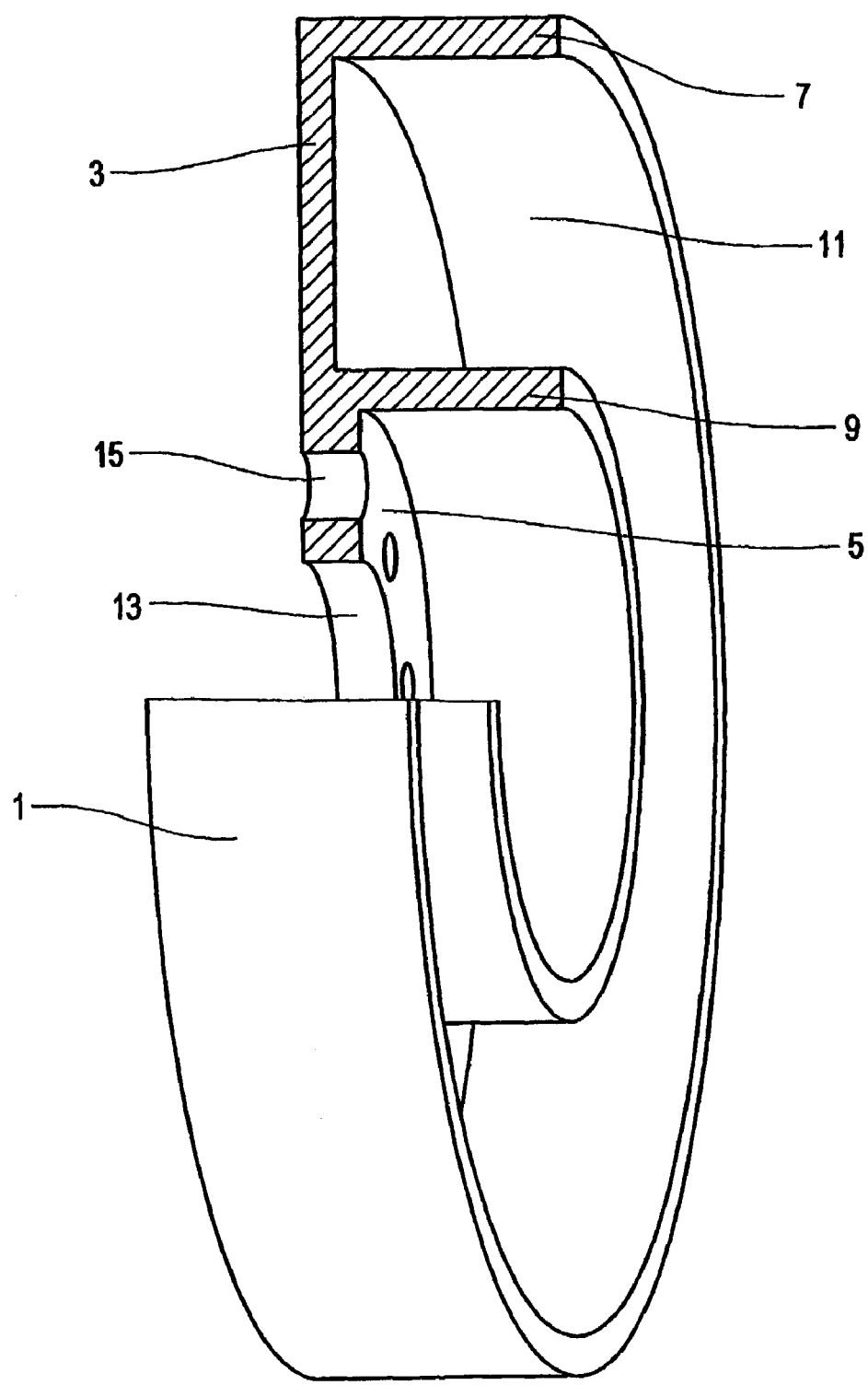
FIG. 1 is schematic partially sectional representation of a damper housing of a visco-damper.

FIG. 1 is a schematic, partially sectional view of a torsional vibration damper housing which includes a housing body 1 having a working chamber 11 bounded by an outer wall 7, a rear wall 3 of the damper housing and a bearing block 9. A center bore 13 is constructed in the center of the rear wall 3 of the damper housing 1. The housing is connected at the fastening flange 5 by means of screws, bolts or the like, (only bolt holes 15 are shown), with the shaft which is to be damped (not shown). In this case, a calibrated projection of the shaft engages in the center bore 13. FIG. 1 is an axonometric, partially sectional view of the housing of a visco-damper in its original form.

FIG. 2 shows how, from a perforated thick circular plate blank 17, which is illustrated in FIG. 2a, first the bearing block 9 is raised by impact extruding according to the invention, in which case an impact extrusion roller is applied at a radially circumferential distance from the outer circumference of the circular plate blank 17 against a pressing mandrel, which is not shown, and the material mass of the bearing block is pushed-up while the wall thickness 18 of the circular plate blank 17 is reduced. The elevation 19 in FIG. 2b, which remains after impact extruding the bearing block 9, supplies the material for the hydrospinning or rolling-out of the outer jacket 7 in FIG. 2c. By impact extruding the damper housing 1 on the circular plate blank, which forms the rear wall 3 of the housing, a displacement of material mass volumes takes place while forming areas of the rear wall 3 of the housing which vary in their thickness. Thus, FIG. 2c shows clearly that the rear wall of the housing has a thinner dimension in the area of the working chamber 11 than in the area of the fastening flange 5; this area has a thicker construction than the remaining area of the rear wall 3 of the housing.

Figure 3:
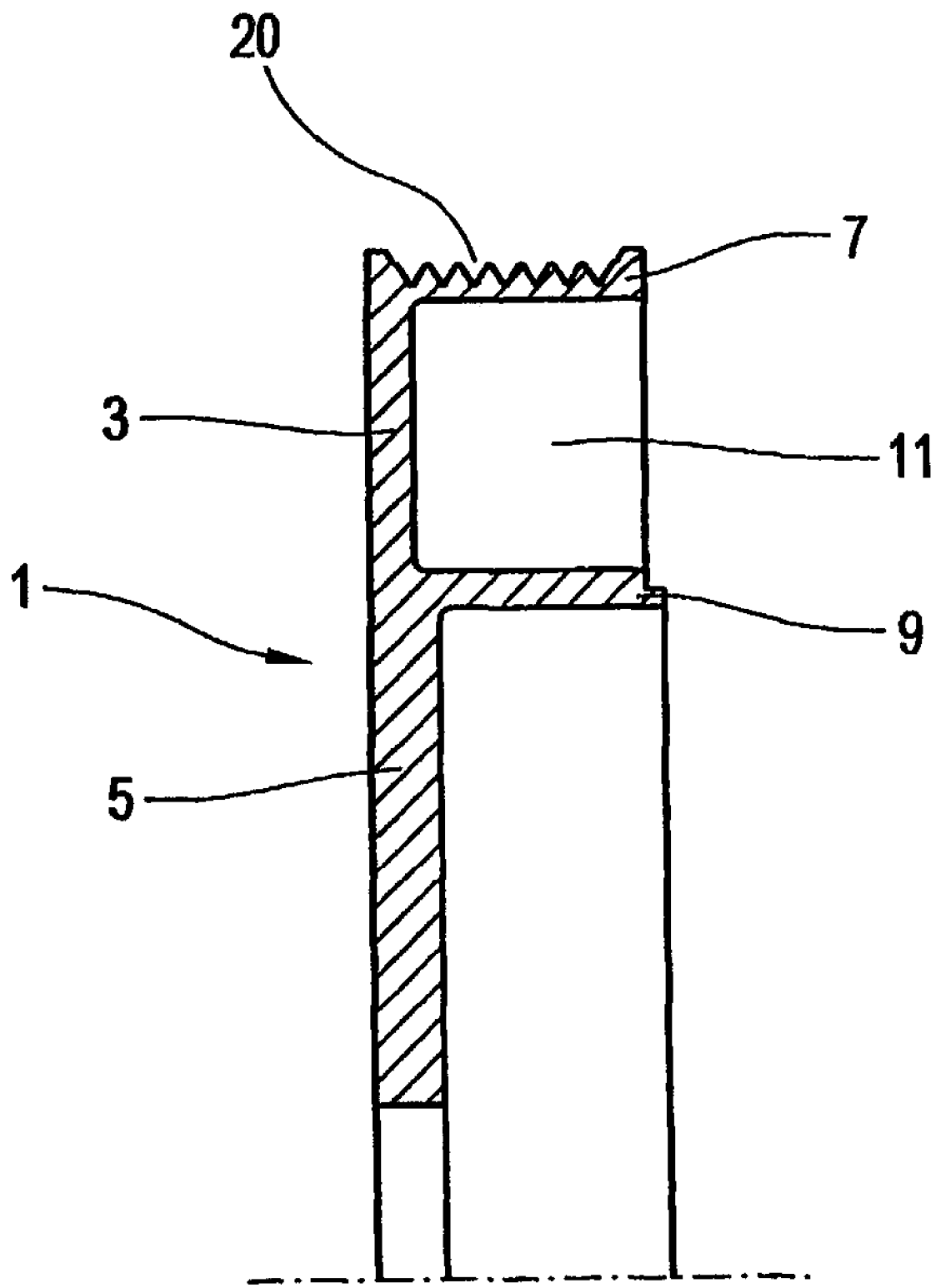
FIG. 3 is a partial sectional view of a visco-damper housing according to the invention with a v-profiled outer wall.

FIG. 3 shows a damper housing 1 which is produced according to FIG. 2 and has an outer jacket 7, a bearing block 9, a rear housing wall 3 in the area of the working chamber 11 as well as a rear housing wall 5 with a thicker dimension in the area of the fastening flange. A ribbed V-track 20 is formed on the outer jacket 7 of the damper housing 1 on the outer circumference of the working chamber 11. A profiled V-belt, thus, a profiled traction device, engages in the profile of this ribbed V-track 20.

FIG. 4 illustrates the method according to the invention of impact extruding a damper housing 1 with a rearward belt rim 21. The process again starts out from a perforated thick circular plate blank 17; here illustrated in FIG. 4a. As described in FIG. 2, in an impact extrusion step, the bearing block 9 is formed while reducing the wall thickness of the thick circular plate blank 17 in area 18. The impact extrusion process oriented radially inward starts from a location spaced away from the exterior circumference of the thick circular plate blank 17 thus forming an elevation 19 in FIG. 4c. On the side situated opposite the bearing block 9 and the elevation 19, while reducing the wall thickness of the circular plate blank 17, the impact extruding of the rearward pulley takes place by means of an impact extrusion roller against an impact extrusion mandrel to such an extent that it is essentially pushed-up vertically away from the circular plate blank. In FIG. 4d, the outer jacket 7 is worked-out by the rolling-out of the elevation 19. By rolling in the ribbed V-belt track 23, the housing receives its final contours in FIG. 4e.

Figure 5:
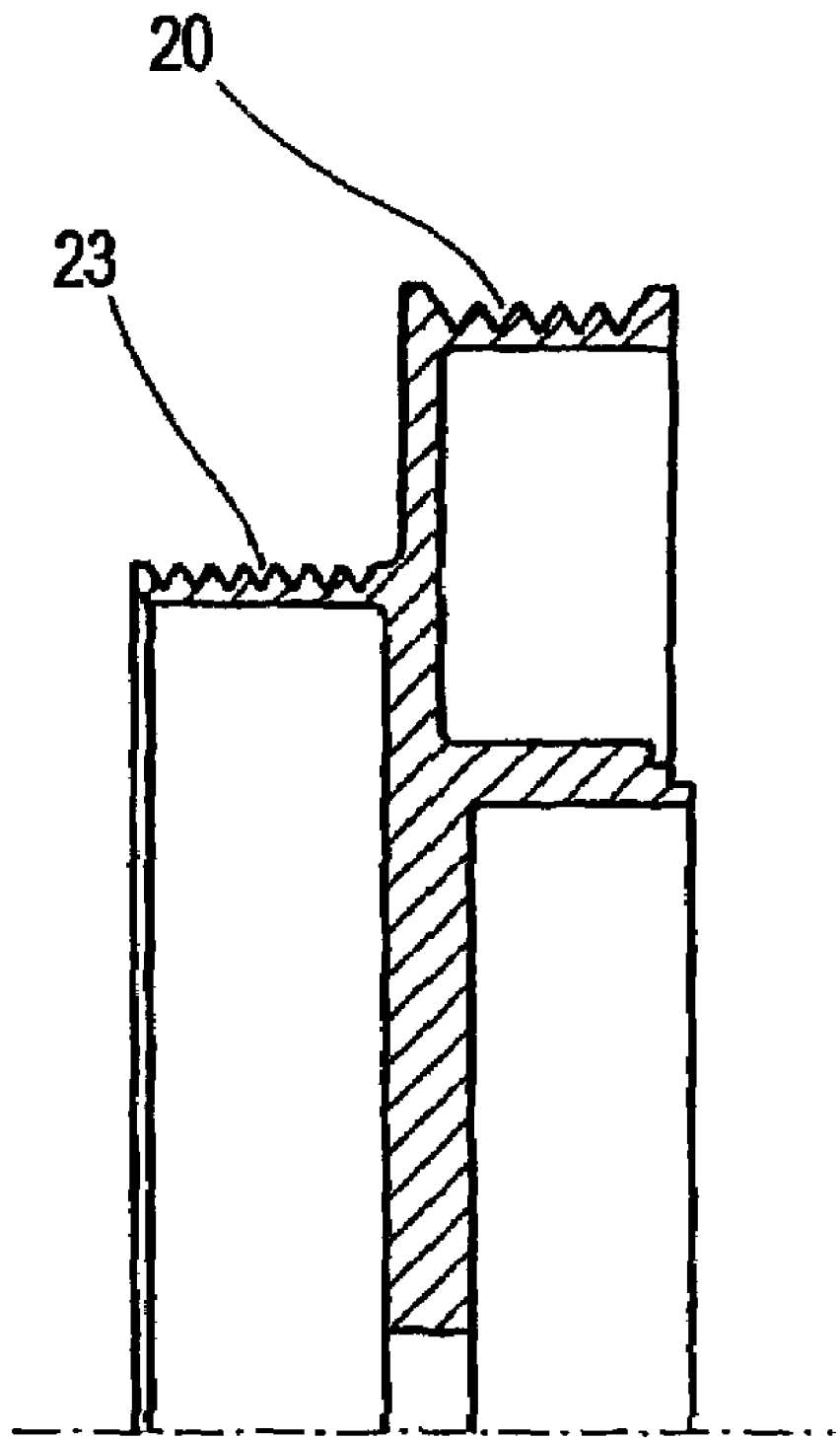
FIG. 5 is a partial sectional view of a visco-damper housing according to the invention with a profiled outer wall and a profiled rearward pulley.

The combination of the two above-described impact extrusion processes results in the damper housing in FIG. 5. A first V-belt track 20 is rolled in on the outer jacket, and the rearward belt rim 21 carries at least a second ribbed V-track 23.

Figure 6:
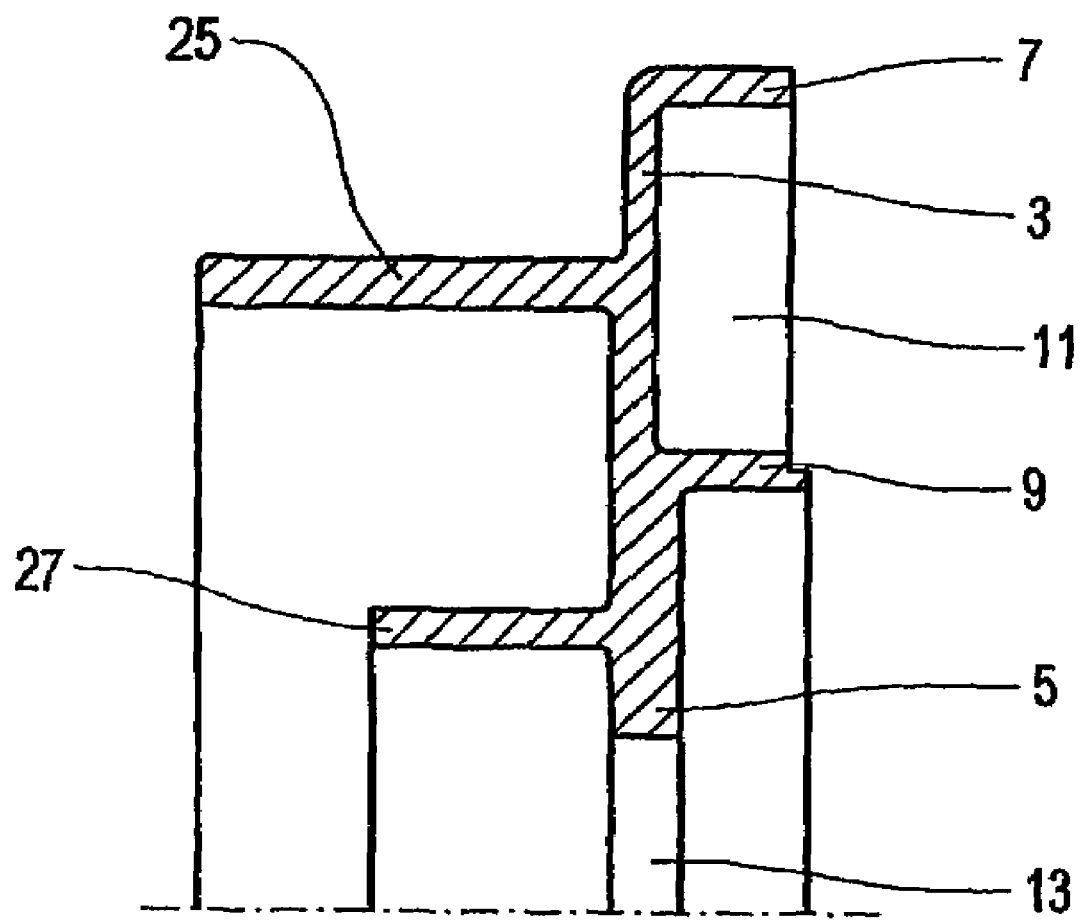
FIG. 6 is a partial view of a damper housing with the supporting collar and the coupling seat produced according to the method of the invention.

FIG. 6 shows another variant of a housing construction which can be formed as a result of the method according to the invention. FIG. 6 illustrates a damper housing which is paired with a torsionally flexibly coupled and, therefore, additionally supported V-belt pulley. In this case, a torsionally flexible rubber coupling is to be connected with the coupling seat 27, while the supporting collar 25 is used for the sliding bearing of the pulley. The forming of the supporting collar 25 takes place by impact extruding on the side of the circular plate blank situated opposite the working chamber 11 in a radially inward direction (from the radial outside to the radial inside). The construction of the coupling seat takes place by impact extruding material of the circular plate blank, following the supporting collar 25 in the direction of the center bore 13. This ensures that, in the area of the center bore, thus, in the area of the coupling seat, the largest wall thickness of the housing rear wall 3 is available in the area 5 and, as a result, an important stability criterion of the housing body is met.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

TABLE OF REFERENCE NUMBERS 1 damper housing
3 rear wall of housing
5 fastening flange
7 outer jacket
9 bearing block
11 working chamber
13 center bore
15 bolt holes
17 thick circular plate blank
18 wall thickness reduction
19 elevation
20 ribbed V-track on the outer jacket
21 rearward belt rim
23 rearward ribbed V-track
25 supporting collar
27 coupling seat

What is claimed is:

1. A method for producing a torsional vibration damper housing having a working chamber fillable with a viscous damping medium and a fastening flange operably designed to allow for fastening the damper housing to a rotating machine part to be damped, the method comprising the acts of:
obtaining a thick circular plate blank; and
in successive impact extrusion shaping steps in a non-cutting manner, impact-extruding all parts of the damper housing that project out of a plane of the thick circular plate blank while reducing a wall thickness of the thick circular plate blank, the thick circular plate blank forming a rear wall of the damper housing formed in one-piece.

2. The method according to claim 1, wherein the act of impact extruding all parts of the damper housing further comprises the acts of:
fixing the thick circular plate blank on an impact extrusion machine;
pressing from the circular plate blank a radially interior wall of a bearing block partially forming the working chamber beginning at a defined distance on a radially exterior circumference of the circular plate blank using an impact extrusion roller against an impact extrusion mandrel body; and
rolling out an elevation on a radially outward circumference of the circular plate blank using an impact extrusion roller against a cylinder sleeve while shaping-out a radially exterior wall to form an outer jacket of the working chamber, which outer jacket extends at a right angle away from the circular plate blank.

3. The method according to claim 2, further comprising the act of:
on a surface of the outer jacket facing radially outward, in a non-cutting manner, while pressing the outer jacket against an impact extrusion mandrel body, forming a profiled running track adapted to receive a profiled traction device.

4. The method according to claim 3, wherein the act of forming the profiled running track forms a poly-V-track adapted to receive a ribbed V-belt.

5. The method according to claim 2, further comprising the act of:
forming a rearward pulley by impact extruding the rear wall on a side opposite the working chamber from a radially outward to a radially inward direction against an impact extrusion mandrel body.

6. The method according to claim 5, further comprising the act of:
profiling the rearward pulley to form a profiled running track while impact extruding a surface of the pulley against an impact extrusion mandrel body.

7. A method according to claim 6, wherein the profiled running track is a poly-V-track adapted to receive a ribbed-V-belt.

8. The method according to claim 2, further comprising the act of:
impact extruding in a non-cutting manner a supporting collar and a coupling seat for receiving a torsionally elastically uncoupled pulley on a side of the circular plate blank opposite the outer jacket and the bearing block against an impact extrusion mandrel body.

9. The method according to claim 8, wherein the act of impact extruding the supporting collar occurs by impact extruding the circular plate blank from a radially outward to a radially inward direction and, wherein the act of impact extruding the coupling seat takes place by an impact extrusion roller impact-extruding material from a radially outward direction, starting behind the supporting collar, radially inward toward a center bore such that the coupling seat is pushed-up against an impact extrusion mandrel body.

* * * * *